United States Patent
Ding

(10) Patent No.: US 9,538,440 B2
(45) Date of Patent: Jan. 3, 2017

(54) METHOD AND SYSTEM OF CHANGING SERVICE POINTS

(71) Applicant: Tencent Technology (Shenzhen) Company Limited, Shenzhen (CN)

(72) Inventor: Xiaocheng Ding, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 118 days.

(21) Appl. No.: 14/551,359

(22) Filed: Nov. 24, 2014

(65) Prior Publication Data

US 2015/0078340 A1 Mar. 19, 2015

Related U.S. Application Data

(63) Continuation of application No. PCT/CN2013/075115, filed on May 3, 2013.

(30) Foreign Application Priority Data

May 30, 2012 (CN) .......................... 2012 1 0173581

(51) Int. Cl.
*H04W 36/14* (2009.01)
*H04W 36/12* (2009.01)
(Continued)

(52) U.S. Cl.
CPC ......... *H04W 36/14* (2013.01); *H04W 36/0011* (2013.01); *H04L 67/1036* (2013.01);
(Continued)

(58) Field of Classification Search
CPC .. H04W 36/0011; H04W 36/14; H04W 36/12; H04W 36/0066; H04L 64/2814; H04L 67/1036

See application file for complete search history.

(56) References Cited

U.S. PATENT DOCUMENTS

2006/0047801 A1* 3/2006 Haag ................... H04L 41/0226
709/223
2006/0172738 A1 8/2006 Kwon et al.
(Continued)

FOREIGN PATENT DOCUMENTS

CN 1859789 A 11/2006
CN 101052208 A 10/2007
(Continued)

OTHER PUBLICATIONS

Official Action in JP Application No. 2015-514332 dated Oct. 6, 2015, 4 pages.
(Continued)

*Primary Examiner* — Brian D Nguyen
(74) *Attorney, Agent, or Firm* — Marshall, Gerstein & Borun LLP

(57) ABSTRACT

Various examples provide a method of changing service points. According to the method, a serving service point obtains a changing request, and obtains a user identity from the changing request; locates a target service point by using the changing request; obtains serving user data corresponding to the user identity, sends the serving user data to the target service point; receives a changing response returned by the target service point, and redirect a client corresponding to the user identity to connect to the target service point. Various examples also provide a system of changing service points. The above method and system can change service points in real time.

20 Claims, 5 Drawing Sheets

(51) Int. Cl.
*H04W 36/00* (2009.01)
*H04L 29/08* (2006.01)

(52) U.S. Cl.
CPC ..... *H04L 67/2814* (2013.01); *H04W 36/0066* (2013.01); *H04W 36/12* (2013.01)

(56) References Cited

U.S. PATENT DOCUMENTS

| | | |
|---|---|---|
| 2006/0271700 A1 | 11/2006 | Kawai et al. |
| 2009/0316656 A1 | 12/2009 | Zhao et al. |
| 2010/0085962 A1 | 4/2010 | Issaeva et al. |
| 2011/0076985 A1* | 3/2011 | Chami ............... H04L 45/22 455/405 |
| 2011/0167272 A1* | 7/2011 | Kolesnikov ........ H04L 9/3242 713/171 |
| 2012/0231828 A1* | 9/2012 | Wang ................. H04W 74/04 455/509 |
| 2012/0238273 A1* | 9/2012 | Lim .................... H04W 16/04 455/436 |
| 2012/0264431 A1* | 10/2012 | Lee ................. H04W 36/0061 455/436 |

FOREIGN PATENT DOCUMENTS

| | | |
|---|---|---|
| CN | 101325806 A | 12/2008 |
| CN | 101945449 A | 1/2011 |
| JP | 2006-332825 A | 12/2006 |
| KR | 2006-0088072 A | 8/2006 |
| WO | WO-2008/084316 A1 | 7/2008 |

OTHER PUBLICATIONS

Search Report in Application No. PCT/CN2013/075115 dated Aug. 8, 2013.
Office Action in KR Application No. 10-2014-7036970 dated Feb. 1, 2016, 9 pages.
Search Report in EP Application No. 13796354.2 dated Jun. 24, 2015, 8 pages.
Office Action in CN Application No. 201210173581.X dated Jun. 4, 2014, 6 pages.
International Preliminary Report on Patentability and Written Opinion in International Application No. PCT/CN2013/075115 dated Dec. 2, 2014, 10 pages.

* cited by examiner

METHOD AND SYSTEM OF CHANGING SERVICE POINTS

The present disclosure is a continuation application of pending International Application PCT/CN2013/075115, filed on May 3, 2013, which claims priority of Chinese patent application No. 201210173581.X titled "method and apparatus of changing service points" and filed on May 30, 2012 with the Patent Office of the People's Republic of China, the disclosure of which is incorporated by reference.

TECHNICAL FIELD

The present disclosure relates to Internet technology, and particularly, to a method and system of changing service points.

BACKGROUND

According to conventional Internet techniques, multiple service points (server points for processing data requests) are generally adopted for load-balancing because a single server has limited computing capabilities and cannot handle a large amount of data requests at the same time. For example, multiple service points may be deployed according to geographical areas, e.g., a service point is deployed in each province, and each service point processes data requests initiated by users from the area where the service point locates.

In the conventional multi-service point load-balancing scheme, users are served by respective dedicated service points, and user data of users is also stored in respective service points, and users served by different service points usually can not directly communicate with each other. For example, in an online game, game players in different service zones are not able to play the game together in the same game process (players served by the same server can play the game together in the same game process).

In order to enable cross-server exchange of user data, a user may need to change its serving service point. According to a conventional mechanism, when user 1 served by service point A has the need of exchanging data with user 2 served by service point B, user 1 is required to fill out an application form to apply for changing a service point. Then an administrator modifies a configuration file to change the serving service point of user 1 from service point A into service point B, and transfers user data of user 1 from service pint A to service point B. After user 1 finishes data exchange with user 2 via service point B, user 1 has to fill out another application form, and the administrator performs the same operations again to change the serving service point of user 1 back to be service point A and transfer user data of user 1 to service point A.

Therefore, in the conventional method of changing service points, users have to fill out application forms applying for changing the service points, and the applications need to be approved by an administrator. After determining the application forms are correctly filled, the administrator modifies the configuration file manually to re-configure the serving service points of the users. The changing process cannot be completed in real time.

SUMMARY

Various examples of the present disclosure provide a method of changing service points, which changes service points in real time.

According to the method of changing service points, a serving service point obtains a changing request, and obtains a user identity from the changing request;

the serving service point determines a target service point by using the changing request;

the serving service point obtains serving user data corresponding to the user identity, sends the serving user data to the target service point; and the serving service point receives a changing response from the target service point, redirects a client corresponding to the user identity to connect to the target service point.

In an example, the serving service point may determine the target service point by using the changing request through the following procedures:

the serving service point obtains an identity of the target service point by using the changing request; and the serving service point obtains routing information for accessing the target service point from a pre-defined routing point by using the identity of the target service point.

In an example, the routing information may include proxy identities of proxy points and a hopping sequence of the proxy points;

the serving service point may send the serving user data to the target service point through the following procedures:

the serving service point obtains proxy points for forwarding data by using the identities of the proxy points in the routing information;

the serving service point sends the serving user data to the proxy points according to the routing information;

the proxy points forward the serving user data to the target service point hop by hop according to the hopping sequence of the proxy points in the routing information.

In an example, the proxy points may belong to at least one hierarchy;

the proxy points may forward the serving user data to the target service point hop by hop according to the hopping sequence of the proxy points in the routing information through the following procedures:

the proxy points forward the serving user data to the target service point hop by hop and hierarchy by hierarchy according to the hopping sequence of the proxy points in the routing information.

In an example, before sending the serving user data to the target service point, the serving service point may:

obtain first information on workload of the proxy points identified in the routing information and second information on workload of the target service point by using the routing information;

processing the changing request by using a blocking queue based on the first information and the second information.

In an example, before sending the serving user data to the target service point, the serving service point may:

filter the serving user data according to service requirements.

In an example, the target service point may locate the serving service point;

the target service point may obtain target user data corresponding to the user identity stored in the target service point, and send the target user data to the serving service point;

the serving service point receives the target user data, merges the target user data with the serving user data, returns a point returning response to the target service point, and recover a connection with the client.

In an example, after the serving service point returns a point returning response to the target service point, the target service point may receive the point returning response, and delete the target user data.

In an example, before locating the serving service point, the target service point may:

return a changing response to the serving service point, and monitoring a serving duration;

after it is judged that the serving duration reaches a timeout period, perform the procedure of locating the serving service point.

In an example, after receiving the changing response returned by the target service point, the serving service point may:

lock the serving user data; and before merging the target user data with the serving user data, the serving service point may:

unlock the serving user data.

Various examples of the present disclosure provide a system of changing service points, which changes service points in real time.

The system of changing service points may include service points. The service points include a serving service point. The serving service point may include:

a changing request obtaining module, adapted to obtain a changing request, and obtain a user identity from the changing request;

a serving point locating module, adapted to locate a target serving point by using the changing request;

a serving user data obtaining module, adapted to obtain serving user data corresponding to the user identity;

a serving user data sending module, adapted to send the serving user data to the target service point, and receive a changing response returned by the target service point; and a connection control module, adapted to redirect a client corresponding to the user identity to connect to the target service point.

In an example, the system may also include a routing point, adapted to store routing information on routes between service points; the serving point locating module is also adapted to obtain an identity of the target service point from the changing request, obtain routing information on a route to the target service point from the pre-defined routing point by using the identity of the target service point.

In an example, the system may also include a plurality of proxy points; the routing information may include proxy identities of proxy points and a hopping sequence of the proxy points;

the serving user data sending module is also adapted to obtain the proxy points for forwarding the serving user data by using the proxy identities in the routing information, and send the serving user data to the proxy points according to the routing information;

the proxy points are adapted to forward the serving user data to the target service point hop by hop according to the hopping sequence in the routing information.

In an example, the proxy points may belong to at least one hierarchy;

the proxy points are adapted to forward the serving user data to the target service point hop by hop and hierarchy by hierarchy according to the hopping sequence of the proxy points in the routing information.

In an example, the serving service point may also include a workload obtaining module, adapted to obtain first information on workload of the proxy points identified in the routing information and second information on workload of the target service point;

the serving service point may also include a queue processing module, adapted to process the changing request by using a blocking queue according to the first information and the second information.

In an example, the serving service point may also include a serving user data filtering module, adapted to filter the serving user data according to service requirements.

In an example, the service points may also include a target service point. The target service point may include a target point locating module, a target user data obtaining module and a target user data sending module.

The target point locating module is adapted to locate the serving service point.

The target user data obtaining module is adapted to obtain target user data corresponding to the user identity stored in the target service point.

The target user data sending module is adapted to send the target user data to the serving service point.

The serving service point may also include a serving user data merging module, adapted to merge the target user data with the serving user data.

The serving user data sending module is also adapted to return a point returning response to the target service point.

The connection control module is also adapted to recover a connection with the client.

In an example, the target user data sending module is also adapted to receive a point returning response from the serving service point.

The target service point may also include a target user data deleting module, adapted to delete the target user data.

In an example, the target user data sending module is also adapted to return a changing response to the serving service point.

The target service point may also include a timeout detecting module, adapted to monitor a service duration, and call the target point locating module in response to a determination that the service duration reaches a timeout period.

In an embodiment, the serving service point may also include a data protecting module, adapted to lock the serving user data after the serving data sending module receives changing response; and unlock the serving user data before the serving user data merging module merges the target user data with the serving user data.

According to the method and system of changing service points, after receiving a changing request from a client, the serving service point may locate the target service point by using the changing request in real time, and send user data to the target service point. The serving service point redirects a connection with the client to the target service point automatically after receiving a changing response (changing acknowledgement) sent by the target service point. As such, the changing request of the user can be handled in real time, and changing of service points can be implemented in real time.

DETAILED DESCRIPTION

Figure 1:
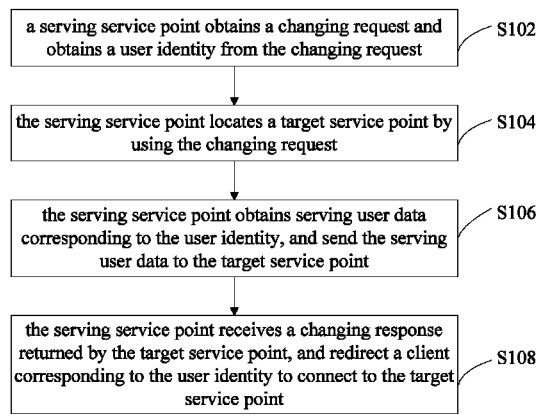
FIG. 1 is a flowchart illustrates a method of changing service points in accordance with an example of the present disclosure.

In an example as shown in FIG. 1, a method of changing service points may include the following procedures.

At block S102, a serving service point obtains a changing request, and obtains a user identity from the changing request.

The serving service point refers to a service point to which a client is connected before the change of service points. In an example, the user may send the changing request to the serving service point via the client to apply for changing a service point. The changing request may include a user identity corresponding to the client that sent the changing request.

For example, the user may input an instruction into the client to send the changing request to the service point the client is connected to (i.e., the serving service point). For example, in an online game, a user may talk to a predetermined NPC (non-player controlled character) to send a changing request to the service point the user is connected to (i.e., the serving service point).

In another example, the changing request may be sent by a controlling point. The controlling point may be a predefined device for controlling operations of service points, and may force a client corresponding to a user identity to change service points according to service requirements.

In block S104, the serving service point locates a target service point by using the changing request.

The target service point refers to a service point to which the client is to be connected after the change of service points. In an example, the changing request may also include an identity of the target service point.

In an example, the procedure of the serving service point locating the target service point by using the changing request may include:

the serving service point obtains the identity of the target service point from the changing request; the serving service point obtains routing information on a route to the target service point from a pre-defined routing point by using the identity of the target service point.

Figure 2:
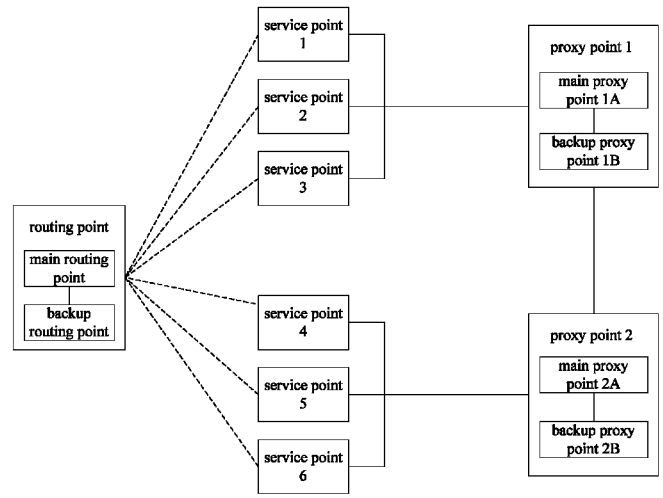
FIG. 2 is a schematic diagram illustrating a network topology in which a service point is connected with a routing point, a proxy point in accordance with an example of the present disclosure.

As shown in FIG. 2, the routing point is pre-defined point, connected to service points, and is adapted to store routing information on connections between points. The serving service point may locate the target service point by using the routing information.

In an example, service points may send a heartbeat message at intervals to keep connected to the routing point.

In an example, the procedure of the serving service point obtaining the routing information for routing to the target service point from the routing point by using the target service point identity may include:

the serving service point searches in a local machine for routing information corresponding to the target service point identity, and obtains the routing information from the pre-defined routing point by using the target service point identity if the routing information is not found in the local machine.

In an example, the serving service point may cache the routing information and the routing information into a local machine after obtaining the routing information on a route to the target service point from the pre-defined routing point by using the target service point identity.

In an example, the procedure of the serving service point locating the target service point by using the changing request may include: the serving service point sends a route obtaining request to the routing point; the routing point allocates the target service point for the serving service point after receiving the route obtaining request, obtains routing information corresponding to the target service point allocated, and sends the routing information to the serving service point.

In an example, the routing point may store workload information of service points connected to the routing point. When the route obtaining request does not specify a target service point identity, the routing point may allocate a service point having a minimal workload (i.e., the most disengaged service point) as the target service point for the serving service point according to the workload information. In an example, the routing point may randomly allocate a target service point for the serving service point.

In an example, the routing point may be deployed in a main/backup mode. As shown in FIG. 2, a main routing point and a backup routing point store the same routing information. The main routing point may synchronize data with the backup routing point periodically. The serving service point may obtain the routing information on a route to the target service point from the backup routing point if the serving service point fails to obtain the routing information from the main routing information.

The routing point may be established in a main/backup mode so that when there is a single routing point failure, the serving service point can still obtain the routing information. Therefore, data loss is prevented, and data security is improved.

At block S106, the serving service point obtains serving user data corresponding to the user identity, sends the serving user data to the target service point.

After the client is connected with the service point, the service point may process a data request sent by the client, generate and store user data according to a processing result. The serving user data refers to user data stored in the serving service point. The user data may be stored in a disk or a database in the serving point and associated with the user identity.

In an example, the serving service point may filter the serving user data according to service requirements before sending the serving user data to the target service point.

The service requirements may specify serving user data needed in data exchange between the client and the target service point. The serving service point filters the serving user data based on the service requirements and sends the part of serving user data obtained from the filtering that is needed in data exchange between the client and the target service point to the target service point. As such, the amount of data transmitted can be greatly reduced, data redundancy is reduced, and bandwidth utility ratio can be increased.

In an example, the routing information may include proxy identities of proxy points and a hopping sequence of the proxy points.

The procedure of the serving service point sending the serving user data to the target service point may include:

the serving service point obtains proxy points for forwarding data by using proxy identities in the routing information, and sends the serving user data to the proxy points according to the routing information.

The proxy points forward the serving user data to the target service point hop by hop according to the hopping sequence of the proxy points specified in the routing information.

In an example, the proxy points may belong to at least one hierarchy. The procedure of the proxy points forward the serving user data to the target service point hop by hop according to the hopping sequence of the proxy points specified in the routing information may include:

the proxy points forward the serving user data to the target service point hop by hop and hierarchy by hierarchy according to the hopping sequence of the proxy points in the routing information.

Figure 3:
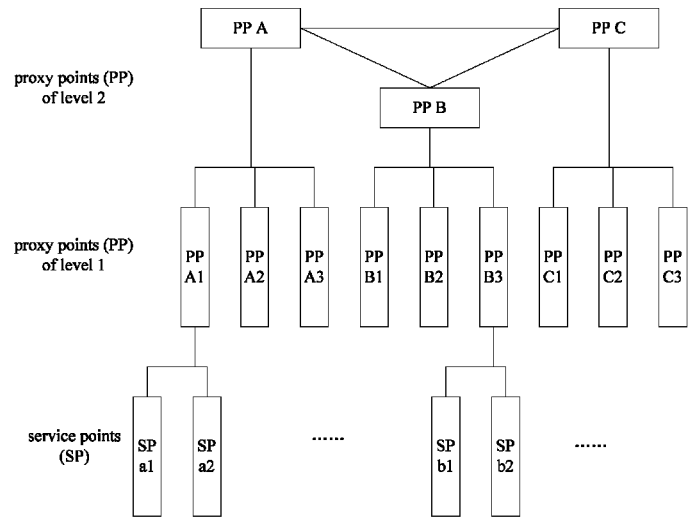
FIG. 3 is a schematic diagram illustrating a network topology in which a service point is connected with a proxy point in accordance with an example of the present disclosure.

As shown in FIG. 2, the service points are divided into a plurality of groups, and service points in each group are connected with a proxy point. In an example, as shown in FIG. 3, the proxy points may belong to at least one hierarchy, i.e., proxy points of level 1, proxy points of level 2, . . . and proxy points of level N. Proxy points of the same level may also be divided into a plurality of groups, and proxy points in one group may be connected with a proxy point from an upper level to form a multi-layer pyramid-like structure. Each proxy points of the bottom level are connected with each group of service points.

In an example, the serving service point may send the serving user data in a data packet. The serving service point may generate the header of the data packet for the serving user data by using the routing information. As shown in Table 1, the header of the data packet may include version information, total hops, current hops, the identity of the serving service point, the identities of the proxy points and the hopping sequence of the proxy points.

TABLE 1

| Version number | Total hops | Current hops | Point ID 1 | Point ID 2 | Point ID 3 |
| --- | --- | --- | --- | --- | --- |

A point ID may be the identity of a proxy point or the identity of a service point. The hopping sequence of the proxy points may be in the form of point identities arranged in a certain order.

Table 1 is merely an example of routing information in a packet header, the payload of the data packet may not necessarily include a table identical or similar to Table 1.

In an example, the procedure of the proxy points forward the serving user data to the target service point hop by hop according to the hopping sequence of the proxy points in the routing information may include:

a proxy point receives a data packet including the serving user data sent by the serving service point, parses the header of the data packet, obtains an identity of a point of the next hop (which may be the identity of a proxy point or the identity of the target service point) based on the current hops, sends the packet to the point of the next hop (which may be a proxy point or the target service point). The proxy points repeat the process until the packet is sent to the target service point.

By pre-setting proxy points, service points do not have to be connected to each other to form a mesh network. In an example, proxy points may be divided into multiple hierarchies to prevent the proxy points from forming a mesh network. When a service point is added, the service point only has to establish a connection with one of the proxy points instead of establishing a connection with each of the proxy points. Thus, network capacity can be easily increased.

Pre-setting proxy points can facilitate data transmission in a network which includes multiple sub networks and needs NAT. For example, a plurality of sub networks may be pre-set based on geographical areas. Each sub network may include service points providing service for the geographical area. A gateway of a sub network may serve as a proxy point. When a service point is to transmit data to a service point in a sub network in another geographical area, the data may be forwarded by the proxy point hierarchy by hierarchy to avoid NAT which is necessary when service points are directly connected with each other.

In an example as shown in FIG. 2, a proxy point may be configured in a main/backup mode. When a failure occurs in a main proxy point, data may be forwarded by a backup proxy point.

By configuring a proxy point in a main/backup mode, data can still be forwarded by the backup proxy point in case of the main proxy point fails. Thus, it prevents the system from becoming paralysis due to a failure in a single point and improves data security.

In an example, the point identity may be the IP address of the point. A serving service point may send a data packet to a target service point or a proxy point based on the IP address. In an example, a proxy point may search in a routing point for an IP address corresponding to a point identity, and send a data packet to the point by using the IP address.

In an example, the serving service point may obtain workload information of proxy points corresponding to the routing information and workload information of the target service point before sending the serving user data to the target service point. The serving service point may process the changing request by using a blocking queue based on the workload information.

Proxy points that are going to forward the serving user data may be determined by using the routing information. The workload information of a proxy point may include a bandwidth utility ratio, computation capability and the size of the cache of the proxy point. The workload information of the target service point may include a bandwidth utility ratio, computation capability and the size of the cache of the target service point. The workload information of the proxy point and the target service point may be stored in the routing point and may be updated at intervals. The serving service point may obtain the workload information from the routing point.

The process of the serving service point processing the changing request by using a blocking queue based on the workload information may include: calculating a workload capacity by using the workload information and a predefined weight, performing the step of sending the serving user data to the target serve point if the load capacity is larger than a threshold, or adding the changing request into a pre-defined blocking queue if the load capacity is not larger than the threshold. The step of the serving service point processing the changing request by using a blocking queue based on the workload information may also include: the serving service point obtains a changing request from the blocking queue at intervals and performs the step of locating the target service point by using the changing request.

When a large amount of simultaneous changing requests are obtained, only a small portion of the changing requests are processed at the same time. Those received but not processed changing requests are stored in a pre-defined blocking queue in the order as the changing requests were received. When the proxy points and the target service point are not too busy, the changing requests in the blocking queue are processed in turn to avoid the system being paralyzed by overloaded service points and proxy points in case of highly concurrent changing requests, thus the system can be more stable.

In an example, the serving service point may send a sequence number of the position of the changing request in the blocking queue to the client. The client may display the sequence number. The sequence number may be used by the user to estimate the waiting time before the changing request is processed, which facilitates the user to control the process.

In an example, the serving user data may include a user identity. The process may also include: after receiving the serving user data, the target service point validate the received serving user data, and store the serving user data and corresponding user identity, and return a changing response to the serving service point.

At block S108, the serving service point receives a changing response from the target service point, redirects the client corresponding to the user identity to connect to the target service point.

After receiving the changing response from the target service point, the serving service point may obtain and send the IP address and the port of the target service point to the client corresponding to the user identity, i.e., the client corresponding to the changing request. The client may be the client that send the changing request or a client specified by the user identity in the changing request. The client may establish a connection with the target service point by using the IP address and the port.

In an example, the changing response may also include a cipher key. Before sending the changing response to the serving service point, the target service point may generate a cipher key based on the serving service point and the user identity.

The procedure of the serving service point redirecting the client to connect to the target service point may include: the serving service point may redirect a connection corresponding to the changing request to the target service point by using the cipher key. When the cipher key is determined to be valid during the redirecting procedure, the change of service point is successful, and a connection is established between the client and the target service point. If the cipher key is determined to be invalid, the change of service point is failed. The target service point may delete the serving user data.

Figure 4:
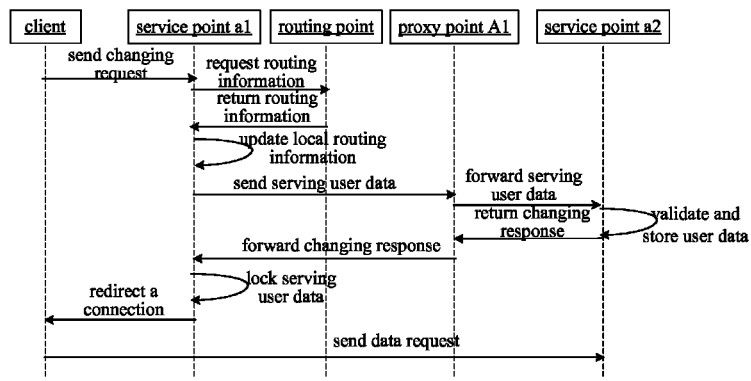
FIG. 4 is a sequence diagram illustrating a method of changing service points in accordance with an example of the present disclosure.

In an example as shown in FIG. 3, service point a1 is the serving service point, and service point a2 is the target service point. Service points a1 and a2 are both connected to proxy point A1. FIG. 4 is a sequence diagram illustrating a process of changing a service point from a1 to a2 after a user sent a changing request to service point a1 via a client.

In an example as shown in FIG. 3, when service point a1 is the serving service point and service point a2 is the target service point, serving user data may be forwarded through proxy point A1, proxy point A, proxy point B, proxy point B3 in turn to service point b1 during the process of changing service point from a1 to b1.

Figure 5:
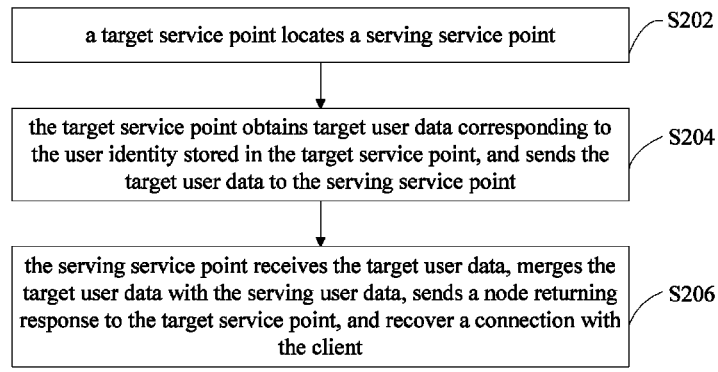
FIG. 5 is a flowchart illustrating a process of returning to a point in the method of changing service points in accordance with an example of the present disclosure.

In an example as shown in FIG. 5, the method of changing service points may also include the following procedures.

At block S202, the target service point locates the serving service point.

The method of the target service point locating the serving service point may be similar to the method of the serving service point locating the target service point, thus is not described further herein.

At block S204, the target service point may obtain target user data corresponding to the user identity stored in the target service point, and send the target user data to the serving service point.

The target user data refers to user data stored in the target service point, i.e., new data generated when the target service point processes data requests sent by the client after the change of service point. The method of the target service point sending the target user data to the serving service point may be similar to the method of the serving service point sending the serving user data to the target service point, thus is not described further herein.

At block S206, the serving service point receives the target user data, merges the target user data with the serving user data, returns a point returning response to the target service point, and recover a connection with the client.

The procedure of the serving service point merging the target user data with the serving user data may include: the serving service point updates the serving user data by using the target user data.

In an example, the serving service point may stop the redirection and send a connection recovery request to recover the connection with the client. In an example, the target service point may redirect the connection with the client to the serving service point, and the serving service point may passively recover the connection with the client.

In an example, before locating the serving service point, the target service point may also obtain a point returning request, and then perform the step of locating the serving service point.

In an example, the point returning request may be initiated by the client. After the change of the service point, when the user finishes data interaction with the target service point, the user may initiate a point returning request via the client. For example, in an online game, a user may initiate a point returning request by talking to an NPC to request returning to the serving service point. After receiving the point returning request, the target service point may perform the step of locating the serving service point to make the client corresponding to the user identity return to the serving service point.

In another example, the changing request may be sent by a controlling point. The serving service point may force the client corresponding to the user identity to return to the serving service point according to service requirements.

In another example, before locating the serving service point, the target service point may:

return a changing response to the serving service point, monitor a service duration; perform the step of locating the serving service point when detecting the service duration reaches a timeout period.

The service duration refers to the length of time the target service data has been processing data requests from the clients after the client is connected to the target service point. The target service point may start counting the time after sending the changing response, and perform the step of locating the serving service point to return the client to the serving service point when detecting the service duration reaches a timeout period (e.g., larger than or equal to a pre-defined length of time).

After the serving service point sends the point returning response to the target service point, the target service point may receive the point returning response and delete the target user data.

The client changes its service point from the serving service point to the target service point, and returns from the target service point to the serving service point after a temporary data interaction, and the target user data generated during the temporary data interaction is temporary user data. The target user data is only stored after merged by the serving service data with the serving user data, and does not need to be backed up. Therefore, deleting the target user data can save storage space in service points, and reduce data redundancy.

In an example as shown in FIG. 3, service point a1 is the serving service point, and service point a2 is the target service point. Service points a1 and a2 are both connected to proxy point A1. In this example, the user has changed the service point from a1 to a2.

Figure 6:
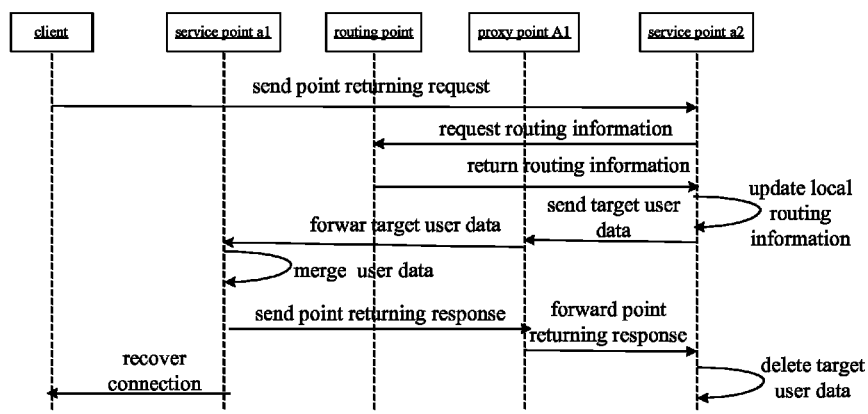
FIG. 6 is a sequence diagram illustrating a process of returning to a point in the method of changing service points in accordance with an example of the present disclosure.

FIG. 6 is a sequence diagram illustrating a process of changing a service point from a2 to a1 after a user sent a point returning request to service point a2 via a client.

Figure 7:
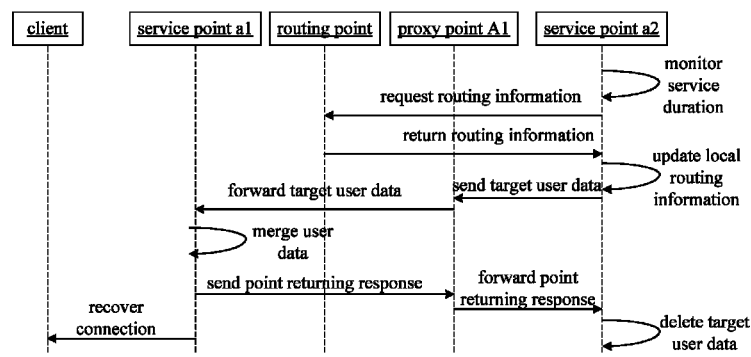
FIG. 7 is a sequence diagram illustrating a procedure of returning to a point in the method of changing service points in accordance with an example of the present disclosure.

In another example, FIG. 7 is a sequence diagram illustrating a process of changing a service point from a2 to a1 after the service point a2 detects a service duration reaches a timeout period.

In an example, after receiving the changing response returned by the target service point, the serving service point may lock the serving service point.

Before merging the target user data with the serving user data, the serving service point may unlock the serving user data.

In an example, a flag may be added to indicate the lock and unlock of the serving user data. When the flag indicates "locked", operations of writing the serving user data initiated by a process or a thread may be rejected; when the flag indicates "unlocked", the process or the thread may be woken up to perform the writing operations on the serving user data.

Figure 8:
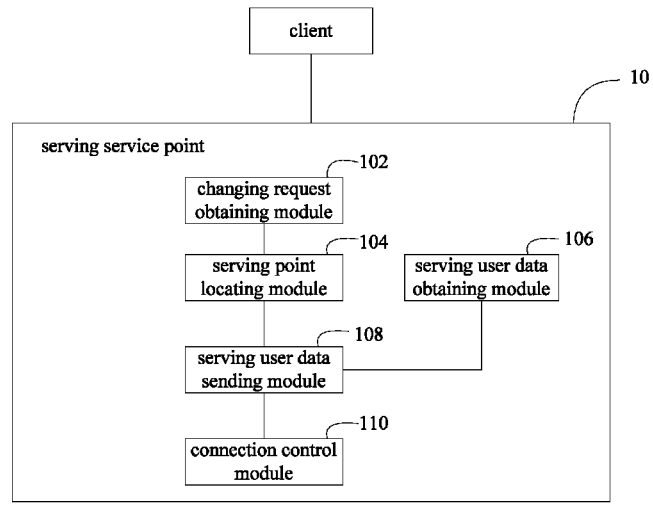
FIG. 8 is a schematic diagram illustrating a system of changing service points in accordance with an example of the present disclosure.

In an example as shown in FIG. 8, a system of changing service points may include service points. The service points may include a serving service point 10. The serving service point 10 may include: a changing request obtaining module 102, a serving point locating module 104, a serving user data obtaining module 106, a serving user data sending module 108 and a connection control module 110.

The changing request obtaining module 102 obtains a changing request, and obtains a user identity from the changing request.

The serving service point refers to the service point the client is connected to before the change of service points. In an example, the user may send the changing request to the serving service point via the client to apply for changing a service point. The changing request may include a user identity corresponding to the client that sent the changing request.

For example, the user may input an instruction into the client to send the changing request to the service point the client is connected to (i.e., the serving service point). For example, in an online game, a user may talk to a specific NPC to initiate the changing request.

In another example, the changing request may be sent by a controlling point. The controlling point may be a pre-defined device for controlling operations of service points, and may force a client corresponding to a user identity to change service points according to service requirements.

The serving point locating module 104 is adapted to locate a target serving point by using the changing request.

The target service point refers to a service point to which the client is to be connected after the change of service point. In an example, the changing request may also include an identity of the target service point.

Figure 9:
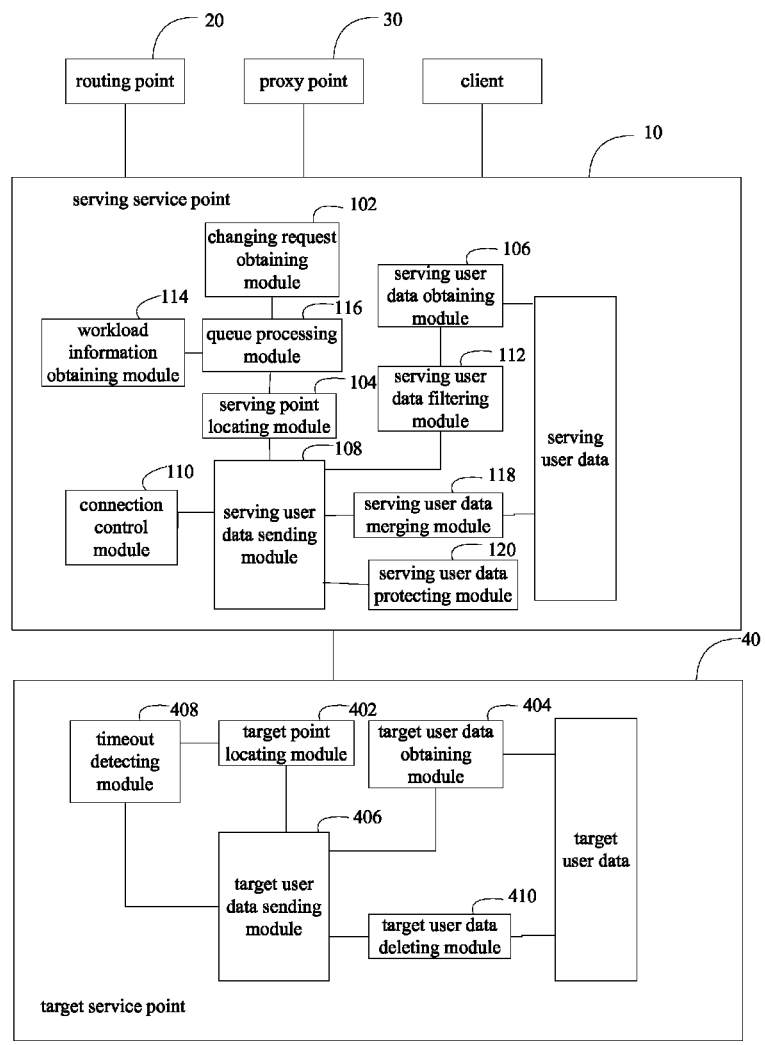
FIG. 9 is a schematic diagram illustrating a system of changing service points in accordance with an example of the present disclosure.

In an example as shown in FIG. 9, the system may also include a routing point 20 adapted to store routing information on connections between the service points. The serving point locating module 104 may obtain the identity of the target service point from the changing request, and obtain routing information on a route to the target service point from a pre-defined routing point by using the identity of the target service point.

As shown in FIG. 2, the routing point is a pre-defined point, connected to service points, and is adapted to store routing information on connections between points. The serving point locating module 104 is adapted to locate a target serving point by using the changing request.

In an example, the serving service point 10 may also include a connection maintaining module (not illustrated in the drawings) adapted to send a heartbeat message at intervals to keep connected to the routing point.

In an example, the serving point locating module 104 may search in a local machine for routing information corresponding to the identity of the target service point, and obtain the routing information from the pre-defined routing point by using the identity of the target service point if the routing information is not found in the local machine.

In an example, the serving point locating module 104 may cache the identity of the target service point and corresponding routing information in the local machine after obtaining the routing information from the routing point by using the identity of the target service point.

In another example, the serving point locating module 104 may send a route obtaining request to the routing point. The routing point 20 may allocate a target service point for the serving service point 10 after receiving the route obtaining request, obtain routing information corresponding to the target service point, and return the routing information to the serving service point 10.

In an example, the routing point 20 may store workload information of service points connected to the routing point. When the route obtaining request does not specify an identity of a target service point, the routing point 20 may allocate a service point having a minimal workload (i.e., the most disengaged service point) as the target service point for the serving service point 10 according to the workload information. In another example, the routing point may randomly allocate a target service point for the serving service point.

In an example, the routing point 20 may be deployed in a main/backup mode. As shown in FIG. 2, a main routing point and a backup routing point may store identical routing information. The main routing point may synchronize data with the backup routing point periodically. The serving service point 10 may obtain the routing information on a route to the target service point from the backup routing point if the serving service point fails to obtain the routing information from the main routing information.

The routing point may be established in a main/backup mode so that when there is a single routing point failure, the serving service point can still obtain the routing information. Therefore, data loss is prevented, and data security is improved.

The serving user data obtaining module 106 may obtain serving user data corresponding to the user identity.

After the user is connected with the service point via the client, the service point may process a data request sent by the client, generate and store user data according to a processing result. The serving user data refers to user data stored in the serving service point 10. The user data may be stored in a disk or a database in the serving point and associated with the user identity.

In an example as shown in FIG. 9, the serving service point 10 may also include a serving user data filtering module 112 adapted to filter the serving user data according to service requirements.

The service requirements may specify the part of serving user data that is required in the data interaction between the client and the target service data. The serving user data filtering module 112 may filter the serving user data according to the service requirements to reduce the amount of irrelevant data transmitted. As such, data redundancy is reduced, and bandwidth utility ratio is increased.

The serving user data sending module 108 may send the serving user data to the target service point, and receive a changing response returned by the target service point.

In an example as shown in FIG. 9, the system may also include at least one proxy point 30. The routing information may include identities of proxy points 30 and a hopping sequence of the proxy points 30.

The serving user data sending module 108 may obtain proxy points for forwarding data by using proxy identities in the routing information, and send the serving user data to the proxy points according to the routing information.

The proxy points 30 may forward the serving user data to the target service point hop by hop according to the hopping sequence of the proxy points specified in the routing information.

In an example, the proxy points 30 may belong to at least one hierarchy. The proxy points 30 may forward the serving user data to the target service point hop by hop and hierarchy by hierarchy according to the hopping sequence of the proxy points specified in the routing information.

As shown in FIG. 2, the service points may be divided into a plurality of groups, and service points in each group are connected with a proxy point. In an example as shown in FIG. 3, the proxy points may belong to at least one hierarchy, i.e., proxy points of level 1, proxy points of level 2, . . . and proxy points of level N. Proxy points of the same level may also be divided into a plurality of groups, and proxy points in one group may be connected with a proxy point from an upper level to form a multi-layer pyramid-like structure. Each proxy points of the bottom level are connected with each group of service points.

In an example, the serving user data sending module 108 may send the serving user data in a data packet. The serving service point may generate the header of the data packet for the serving user data by using the routing information. As shown in Table 2, the header of the data packet may include version information, total hops, current hops, the identity of the serving service point, the identities of the proxy points and the hopping sequence of the proxy points.

TABLE 2

| Version number | Total hops | Current hops | Point ID 1 | Point ID 2 | Point ID 3 |
| --- | --- | --- | --- | --- | --- |

A point ID may be the identity of a proxy point or the identity of a service point. The hopping sequence of the proxy points may be in the form of point identities arranged in a certain order.

Table 1 is merely an example of routing information in a packet header, the payload of the data packet may not necessarily include a table identical or similar to Table 1.

a proxy point receives a data packet including the serving user data sent by the serving service point, parses the header of the data packet, obtains an identity of a point of the next hop (which may be the identity of a proxy point or the identity of the target service point) based on the current hops, sends the packet to the point of the next hop (which may be a proxy point or the target service point). The proxy points repeat the process until the packet is sent to the target service point.

By pre-setting proxy points, service points do not have to be connected to each other to form a mesh network. In an example, proxy points may be divided into multiple hierarchies to prevent the proxy points from forming a mesh network. When a service point is added, the service point only has to establish a connection with one of the proxy points instead of establishing a connection with each of the proxy points. Thus, network capacity can be easily increased.

Pre-setting proxy points facilitates data transmission in a network which includes multiple sub networks and needs NAT. For example, a plurality of sub networks may be pre-set based on geographical areas. Each sub network may include service points providing service for the geographical area. A gateway of a sub network may serve as a proxy point. When a service point is to transmit data to a service point in a sub network in another geographical area, the data may be forwarded by the proxy point hierarchy by hierarchy to avoid NAT which is necessary when service points are directly connected with each other.

In an example as shown in FIG. 2, a proxy point 30 may be configured in a main/backup mode. When a failure occurs in a main proxy point, data may be forwarded by a backup proxy point.

By configuring a proxy point in a main/backup mode, data can still be forwarded by the backup proxy point in case of the main proxy point fails. Thus, it prevents the system from becoming paralysis due to a failure in a single point and improves data security.

In an example, the point identity may be an IP address of a point, and send the data packet by using the IP address. In another example, a proxy point 30 may search in the routing point 20 for an IP address corresponding to a point identity, and send a data packet to the point by using the IP address.

In an example as shown in FIG. 9, the serving service point 10 may also include a workload obtaining module 114 adapted to obtain first information on workload of the proxy points identified in the routing information and second information on workload of the target service point.

As shown in FIG. 9, the serving service point 10 may also include a queue processing module 116 adapted to process the changing request by using a blocking queue according to the workload information.

The workload obtaining module 114 may determine proxy points that are to forward the serving user data by using the routing information. The workload information of a proxy point may include a bandwidth utility ratio, computation capability and the size of the cache of the proxy point. The workload information of the target service point may include a bandwidth utility ratio, computation capability and the size of the cache of the target service point. The workload information of the proxy points 30 and the target service point may be stored in the routing point 20 and may be updated at intervals. The workload obtaining module 114 may obtain the workload information from the routing point.

The queue processing module 116 may calculate a workload capacity by using the workload information and a pre-defined weight. If the workload capacity is larger than a threshold, the data sending module 108 is called to send the serving user data. If the workload capacity is not larger than the threshold, the changing request is added into a pre-defined blocking queue. The queue processing module 116 may output a changing request from the blocking queue at intervals and call the serving point locating module 104 to locate the target service point.

When many users send changing requests simultaneously, only a small number of the changing requests are processed at that time. Those received but not processed changing requests are stored in a pre-defined blocking queue in the order as the changing requests were received. When the proxy points and the target service point are not too busy, the changing requests in the blocking queue are processed in turn to avoid the system being paralyzed by overloaded service points and proxy points in case of highly concurrent changing requests, thus the system can be more stable.

In an example, the queue processing module 116 may send a sequence number of the position of the changing request in the blocking queue to the client. The client may display the sequence number. The sequence number may be used by the user to estimate the waiting time before the changing request is processed, which facilitates the user to control the process.

In an example, the serving user data may include a user identity. The target service point may validate the serving user data, store the serving user data and corresponding user identity, and return a changing response to the serving service point 10.

The connection control module 110 may redirect a client corresponding to the user identity to connect to the target service point.

After receiving the changing response from the target service point, the serving user data sending module 108 may obtain and send the IP address and the port of the target service point to the client corresponding to the user identity, i.e., the client corresponding to the changing request. The client may be the client that sent the changing request or a client specified by the user identity in the changing request. The client may establish a connection with the target service point by using the IP address and the port.

In an example, the target service point may also include a cipher key generating module (not illustrated in the drawings). The changing response may also include a cipher key. The cipher key generating module may generate the cipher key by using the serving service point and the user identity before sending the changing response to the serving service point.

The connection control module 110 may redirect a connection corresponding to the changing request to the target service point based on the cipher key. When the cipher key is determined to be valid during the redirecting procedure, the change of service point is successful, and a connection is established between the client and the target service point. If the cipher key is determined to be invalid, the change of service point is failed, and the target service point may delete the serving user data received.

In an example as shown in FIG. 9, the service points may also include a target service point 40. The target service point 40 may include a target point locating module 402, a target user data obtaining module 404 and a target user data sending module 406.

The target point locating module 402 may locate the serving service point.

The target point locating module 402 may locate the serving service point 10 by using the same method with that of the serving point locating module 104 in the serving service point 10 locating the target service point.

The target user data obtaining module 404 may obtain target user data corresponding to the user identity stored in the target service point.

The target user data refers to user data stored in the target service point 40, i.e., new data generated when the target service point 40 processes data requests sent by the client after the change of service point.

The target user data sending module 406 may send the target user data to the serving service point.

The target user data sending module 406 may send the target user data to the serving service point by using the same method of the serving user data sending module 108 sending the serving user data to the target service point.

The serving service point 10 may also include a serving user data merging module 118 adapted to merge the target user data with the serving user data. The serving user data merging module 118 may update the serving user data by using the target user data.

The serving user data sending module 108 may also return a point returning response to the target service point.

The connection control module 110 may also recover a connection with the client.

In an example, the connection control module 110 may stop the redirection and send a connection recovery request to recover the connection with the client. In an example, the target service point 40 may redirect the connection with the client to the serving service point 10, and the serving service point 10 may passively recover the connection with the client.

In an example, the target service point 40 may also include a returning request obtaining module (not illustrated in the drawings) adapted to obtain a point returning request and call the target point locating module 402.

In an example, the point returning request may be initiated by the client. After the change of the service point, when the user finishes data interaction with the target service point, the user may send a point returning request via the client. For example, in an online game, a user may initiate a point returning request by talking to an NPC to request returning to the serving service point. After receiving the point returning request, the target service point may perform the step of locating the serving service point to make the user return to the serving service point.

In another example, the point returning request may be initiated by a controlling point. The serving service point may force the user to return to the serving service point according to service requirements.

In another example as shown in FIG. 9, the target service point 40 may also include a timeout detecting module 408 adapted to monitor a service duration after returning the changing response, and call the target point locating module 402 when detecting the service duration reaches a timeout period.

The service period refers to the length of time period in which the target service point is processing data requests of the user. The timeout detecting module 408 may start counting the time after sending the changing response, and call the target point locating module 104 to locate the serving service point to return the client to the serving service point 10 when detecting the service duration reaches a timeout period (e.g., larger than or equal to a pre-defined length of time)

In an example as shown in FIG. 9, the target service point 40 may include a user data deleting module 410 adapted to delete the target user data after receiving the point returning response.

The user changes the service point from the serving service point 10 to the target service point 40, and returns from the target service point to the serving service point after a temporary data interaction, and the target user data generated during the temporary data interaction is temporary user data. The target user data may be stored only in the serving service point 10, and does not need to be backed up. Therefore, deleting the target user data can save storage space of the target service point 40, and reduce data redundancy.

In an example as shown in FIG. 9, the serving service point 10 may also include a data protecting module 120 adapted to lock the serving user data after the serving data sending module 108 receives the changing response; and unlock the serving user data before the serving user data merging module 108 merges the target user data with the serving user data.

In an example, the data protecting module 120 may add a flag which indicates the lock and unlock state of the serving user data. When the flag indicates "locked", operations of writing the serving user data initiated by a process or a thread may be rejected; when the flag indicates "unlocked", the process or the thread may be woken up to perform the writing operations on the serving user data.

In an example, the serving service point 10 and the target service point 40 may be two types of devices or two roles of the same type of devices in the process of changing service points, i.e., a service point may serve as the serving service point and may also serve as the target service point. The functions of the serving service point 10 and the functions of the target service point 40 may be integrated into one device, and the device may serve as the serving service point and may also serve as the target service point in operation.

According to the method and system of changing service points, after receiving a changing request from a client, the serving service point may locate the target service point by using the changing request in real time, and send user data to the target service point. The serving service point redirects a connection with the client to the target service point automatically after receiving a changing response (changing acknowledgement) sent by the target service point. As such, the changing request of the user can be handled in real time, and changing of service points can be implemented in real time.

The above embodiments are merely examples of implementation of the present invention, and may include unnecessary details, thus should not be used for limiting the protection scope of the present invention. It should clear for those skilled in the art that any modification and improvement within the principle of the invention should be covered in the protection scope of the invention. Therefore, the protection scope of the present invention should be determined by the extent defined by the indispensable technical features stated in the claims.

The invention claimed is:

1. A method of changing service points, the method comprising:
    providing, by a servicing service point, online service data to a user through a client of the user;
    obtaining, by a serving service point, a changing request from the client which sends the changing request in response to a command inputted by the user, and obtaining a user identity from the changing request;
    locating, by the serving service point, a target service point by using the changing request;
    obtaining, by the serving service point, serving user data corresponding to the user identity, sending the serving user data to the target service point; and
    receiving, by the serving service point, a changing response from the target service point, redirecting the client to connect to the target service point.

2. The method of claim 1, wherein the locating by the serving service point the target service point by using the changing request comprises:
    sending, by the serving service point, a route obtaining request to a routing point; and
    allocating, by the routing point, the target service point for the serving service point after receiving the route obtaining request, obtaining routing information corresponding to the target service point, and return the routing information to the serving service point.

3. The method of claim 1, further comprising: before sending by the serving service point the serving user data to the target service point,
    filtering, by the serving service point, the serving user data according to service requirements.

4. The method of claim 1, further comprising:
    locating, by the target service point, the serving service point;
    obtaining, by the target service point, target user data corresponding to the user identity stored in the target service point, and sending the target user data to the serving service point; and
    receiving, by the serving service point, the target user data, merging the target user data with the serving user data, and returning a point returning response to the target service point, and recovering a connection with the client.

5. The method of claim 4, further comprising: after returning by the serving service point the response to the target service point,
    receiving, by the target service point the point returning response, and deleting the target user data.

6. The method of claim 4, wherein the locating by the serving service point the target service point comprises:
    returning, by the target service point, a changing response to the serving service point, and monitoring a serving duration; and
    performing, by the target service point, the step of locating the serving service point after it is judged that the serving duration reaches a timeout period.

7. The method of claim 4, further comprising: after receiving by the serving service point the point returning response returned by the target service point,
    locking, by the serving service point, the serving user data; and
    before merging the target user data with the serving user data,
    unlocking, by the serving service point, the serving user data.

8. The method of claim 1, further comprising: after receiving by the serving service point the changing response returned by the target service point, generating, by the target service point, a cipher key based on the serving service point and the user identity.

9. The method of claim 8, wherein the redirecting the client corresponding to the user identity to connect to the target service point comprises:

redirecting, by the serving service point, a connection corresponding to the changing request to the target service point based on the cipher key; determining the change of service point is successful if the cipher key is determined to be valid during the redirecting procedure, and establishing a connection between the client and the target service point; determining the change of service point is failed if the cipher key is determined to be invalid.

10. A method of changing service points, the method comprising:

obtaining, by a serving service point, a changing request, and obtaining a user identity from the changing request;

locating, by the serving service point, a target service point by using the changing request;

obtaining, by the serving service point, serving user data corresponding to the user identity, sending the serving user data to the target service point; and receiving, by the serving service point, a changing response from the target service point, redirecting a client corresponding to the user identity to connect to the target service point;

wherein the locating by the serving service point the target service point by using the changing request comprises:

obtaining, by the serving service point, an identity of the target service point from the changing request; and obtaining, by the serving service point, routing information on a route to the target service point from a pre-defined routing point by using the identity of the target service point.

11. The method of claim 10, wherein the routing information comprises at least one identity of at least one proxy point and a hopping sequence of the at least one proxy point;

wherein sending by the serving service point the serving user data to the target service point comprises:

determining, by the serving service point, at least one proxy point for forwarding data by using the at least one identity of the at least one proxy point in the routing information;

sending, by the serving service point, the serving user data to the at least one proxy point according to the routing information; and forwarding, by the at least one proxy point, the serving user data to the target service point hop by hop according to the hopping sequence in the routing information.

12. The method of claim 11, wherein the at least one proxy point belongs to at least one hierarchy;

wherein the forwarding by the at least one proxy point the serving user data to the target service point hop by hop according to the hopping sequence in the routing information comprises:

forwarding, by the at least one proxy point, the serving user data to the target service point hop by hop and hierarchy by hierarchy according to the hopping sequence in the routing information.

13. The method of claim 11, further comprising: before sending by the serving service point the serving user data to the target service point, obtaining first information on workload of the at least one proxy point identified in the routing information and second information on workload of the target service point by using the routing information; and processing, by the serving service point, the changing request by using a blocking queue based on the first information and the second information.

14. The method of claim 13, wherein the processing by the serving service point the changing request by using a blocking queue based on the first information and the second information comprises:

calculating a workload capacity by using the first information and the second information and a pre-defined weight, performing the step of sending by the serving user data to the target service point if the workload capacity is larger than a threshold, or adding the changing request to a pre-defined blocking queue if the workload capacity is not larger than the threshold.

15. The method of claim 14, wherein the processing by the serving service point the changing request by using a blocking queue based on the first information and the second information comprises:

obtaining, by the serving service point, a changing request from the blocking queue at intervals, and performing the step of locating the target service point by using the changing request.

16. A system of changing service points, comprising service points; wherein the service points include a serving service point; the serving service point comprises a processor and memory, the memory comprises computer-readable instructions executable by the processor to:

provide online service data to a user through a client of the user;

obtain a changing request from the client which sends the changing request in response to a command inputted by the user, and obtain a user identity from the changing request;

locate a target serving point by using the changing request;

to obtain serving user data corresponding to the user identity;

send the serving user data to the target service point, and receive a changing response returned by the target service point; and redirect a client corresponding to the user identity to connect to the target service point.

17. The system of claim 16, wherein computer-readable instructions are executable by the processor to send a route obtaining request to a routing point;

the routing point is adapted to allocate the target service point for the serving service point after receiving the route obtaining request, obtain routing information corresponding to the target service point, and return the routing information to the serving service point.

18. The system of claim 16, further comprising a routing point adapted to store routing information on connections between the service points;

wherein the computer-readable instructions are executable by the processor to obtain the identity of the target service point from the changing request, and obtain routing information on a route to the target service point from the pre-defined routing point by using the identity of the target service point.

19. The system of claim 16, wherein the computer-readable instructions are executable by the processor to filter the serving user data according to service requirements.

20. The system of claim 16, wherein the service points further comprise a target service point, the target service point comprises a second processor and second memory, the second memory comprises second computer-readable instructions executable by the processor to:
  locate the serving service point;
  obtain target user data corresponding to the user identity stored in the target service point; and
  send the target user data to the serving service point;
  wherein computer-readable instructions of the serving service point are executable by the processor to merge the target user data with the serving user data;
  return a point returning response to the target service point; and
  recover a connection with the client.

* * * * *